(12) United States Patent
Pfeifer et al.

(10) Patent No.: US 7,351,382 B2
(45) Date of Patent: Apr. 1, 2008

(54) PARTICLE FILTER HAVING A CATALYTICALLY ACTIVE COATING TO ACCELERATE BURNING OFF ACCUMULATED SOOT PARTICLES DURING A REGENERATION PHASE

(75) Inventors: Marcus Pfeifer, Solingen (DE); Barry van Stetten, Rodenbach (DE); Christian Kühn, Hasselroth (DE); Roger Staab, Freigericht (DE); Lutz Marc Ruwisch, Darnstadt (DE); Peter Kattwinkel, Marienheide (DE); Jürgen Geishoff, Biebergemünd (DE); Egbert Lox, Hochwaldhausen (DE); Thomas Kreuzer, Karben (DE)

(73) Assignee: Umicore AG & Co. KG, Hanau (DE)

( * ) Notice: Subject to any disclaimer, the term of this patent is extended or adjusted under 35 U.S.C. 154(b) by 97 days.

(21) Appl. No.: 10/397,984

(22) Filed: Mar. 26, 2003

(65) Prior Publication Data

US 2004/0067176 A1     Apr. 8, 2004

(30) Foreign Application Priority Data

Mar. 28, 2002  (DE)  ................................. 102 14 343

(51) Int. Cl.
| | |
|---|---|
| *B01D 50/00* | (2006.01) |
| *B01J 23/58* | (2006.01) |
| *B01J 23/00* | (2006.01) |
| *B01J 21/00* | (2006.01) |
| *B01J 20/00* | (2006.01) |

(52) U.S. Cl. ...................... 422/177; 502/303; 502/304; 502/324; 502/326; 502/327; 502/334; 502/339; 502/341; 502/349; 502/353; 502/354; 502/355; 502/415; 502/439; 502/524

(58) Field of Classification Search ................ 502/303, 502/304, 324, 326–328, 334, 339, 341, 349, 502/353–355, 415, 439, 524; 422/177
See application file for complete search history.

(56) References Cited

U.S. PATENT DOCUMENTS 3,956,186 A * 5/1976 Iwase et al. ................. 502/263

(Continued)

FOREIGN PATENT DOCUMENTS

DE       31 41 713 A1     5/1983

(Continued)

OTHER PUBLICATIONS

European Search Report, OMG AG & Co. KG., Jul. 17, 2003.

*Primary Examiner*—Cam N. Nguyen
(74) *Attorney, Agent, or Firm*—Kalow & Springut LLP

(57) ABSTRACT

The present invention is directed to a particle filter to remove soot from the exhaust gas of a diesel engine. The particle filter contains a catalytically active coating on a filter body to accelerate bum-off during a regeneration phase of the soot particles collected on the filter. The particle filter comprises a catalytic coating containing compounds of barium, compounds of magnesium, and at least one element of the platinum group metals. The invention is further directed to a process for accelerated combustion of soot particles collected on the filter from lean exhaust gas of a diesel engine in which the soot particles have a soot ignition temperature and the particle filter is actively regenerated from time to time by raising the temperature of the particle filter above the soot ignition temperature and burning off the soot particles.

6 Claims, 4 Drawing Sheets

U.S. PATENT DOCUMENTS

| | | | |
|---|---|---|---|
| 4,188,309 A * | 2/1980 | Volker et al. | 60/302 |
| 4,233,139 A * | 11/1980 | Murrell et al. | 208/112 |
| 4,455,393 A | 6/1984 | Domesle et al. | |
| 4,472,532 A * | 9/1984 | Mooi | 502/302 |
| 4,476,245 A * | 10/1984 | Siefert | 502/302 |
| 4,477,417 A | 10/1984 | Domesle et al. | |
| 4,510,265 A | 4/1985 | Hartwig | |
| 4,515,758 A | 5/1985 | Domesle et al. | |
| 4,588,707 A | 5/1986 | Domesle et al. | |
| 4,828,807 A | 5/1989 | Domesle et al. | |
| 4,849,399 A | 7/1989 | Joy, III et al. | |
| 4,900,517 A | 2/1990 | Domesle et al. | |
| 4,996,031 A * | 2/1991 | Spooner et al. | 423/213.2 |
| 5,100,632 A | 3/1992 | Dettling et al. | |
| 5,290,530 A * | 3/1994 | Muramatsu et al. | 423/239.1 |
| 5,758,496 A | 6/1998 | Rao et al. | |
| 5,792,436 A | 8/1998 | Feeley et al. | |
| 5,800,790 A * | 9/1998 | Imamura et al. | 422/174 |
| 5,884,473 A * | 3/1999 | Noda et al. | 60/274 |
| 5,968,870 A * | 10/1999 | Iizuka et al. | 502/325 |
| 6,023,928 A | 2/2000 | Peter-Hoblyn et al. | |
| 6,093,378 A * | 7/2000 | Deeba et al. | 423/213.5 |
| 6,218,335 B1 * | 4/2001 | Okada et al. | 502/340 |
| 6,372,688 B1 * | 4/2002 | Yamashita et al. | 502/326 |
| 6,375,910 B1 * | 4/2002 | Deeba et al. | 423/239.1 |
| 6,413,904 B1 * | 7/2002 | Strehlau et al. | 502/328 |
| 6,613,299 B2 * | 9/2003 | Dang et al. | 423/239.1 |
| 6,649,563 B2 * | 11/2003 | Nakanishi et al. | 502/439 |
| 6,677,272 B2 * | 1/2004 | Beall et al. | 502/439 |
| 2003/0049191 A1 * | 3/2003 | Twigg | 423/244.07 |
| 2003/0091481 A1 * | 5/2003 | Dang et al. | 422/180 |
| 2003/0211020 A1 * | 11/2003 | Rao et al. | 422/180 |
| 2004/0033175 A1 * | 2/2004 | Ohno et al. | 422/180 |

FOREIGN PATENT DOCUMENTS

| | | |
|---|---|---|
| DE | 32 327 29 C2 | 3/1984 |
| DE | 34 07 172 C2 | 9/1985 |
| EP | 0 341 832 B1 | 10/1996 |
| EP | 0 835 684 A2 | 4/1998 |
| EP | 0 945 608 A2 | 3/1999 |
| EP | 0 982 066 A1 | 8/1999 |
| EP | 1 127 603 A1 | 2/2001 |
| EP | 1 147 802 A | 4/2001 |
| GB | 0 134 407 A | 8/1984 |
| WO | WO 01/12320 A1 | 8/2000 |

* cited by examiner

PARTICLE FILTER HAVING A CATALYTICALLY ACTIVE COATING TO ACCELERATE BURNING OFF ACCUMULATED SOOT PARTICLES DURING A REGENERATION PHASE

FIELD OF INVENTION

The present invention is directed to a particle filter for removal of soot from diesel engine exhaust gas.

BACKGROUND OF INVENTION

Particle filters remove soot particles from the lean exhaust gas of combustion engines, thereby preventing their emission into the atmosphere. Various filter concepts may be employed to accomplish these goals, including but not limited to wall flow filters, filters of ceramic fibers or of ceramic or metallic foams, and filters of wire meshes. These technologies have proven extremely successful at accomplishing their designed tasks. In fact, they can attain filtration levels greater than 95%. Unfortunately, while they are effective at filtering, the filters themselves are not easily regenerated.

Carbon soot, which is one of the major substances trapped on particle filters, burns spontaneously only at temperatures of about 600° C. or greater. But modern diesel engines, generally reach such temperatures only at full load. Therefore, under normal operating conditions, the filters can become plugged after a limited operation time unless additional supportive measures are used to oxidize the soot particles that are separated from the exhaust gas and build up on the particle filters.

Two types of supportive measures may be employed to regenerate the filters: active and passive. With active measures, the temperature of the filter is raised, by, for example, electrical heating, above the temperature needed for oxidation of the soot. Such measures are linked to increased fuel consumption. With passive acting systems, for example, the ignition temperature of the soot is reduced by use of organometallic fuel additives such as ferrocene or by a catalytic coating on the filter.

A number of solutions using different active and passive measures have been offered. For example, German Patent DE 31 41 713 A1 describes a coating containing silver vanadate as the active substance, which reduces the soot ignition temperature. A further development of that invention is described in DE 32 32 729 C2. According to the latter patent, the coating that reduces the ignition temperature can contain lithium pentoxide, vanadium pentoxide with an alkali metal oxide, a vanadate, a perrhenate, or a combination of those substances as the active substance.

DE 34 07 172 describes a means for cleaning oxidizable solid, liquid and gaseous pollutants from diesel engine exhaust gas. For this purpose, the means comprises filter elements arranged successively, either in immediate succession or with spaces between them, in a housing. At least one filter element A, which carries the catalyst that reduces the ignition temperature of the soot and promotes its combustion, and at least one filter element B, which carries the catalyst promoting burning of gaseous pollutants, alternate repeatedly.

Koberstein et al., "Einsatz von Abgashachbehandlungseinrichtungen" ["Use of Exhaust Gas Treatment Systems"] (VDI [Society of German Engineers] Report Number 559, VDI-Verlag [VDI Press] 1985, 275-296) describes a wall flow filter having a combined coating with an ignition catalyst on the channel walls at the gas inlet side and an oxidation catalyst on the gas exit side. There the function of the oxidation catalyst is to oxidize the hydrocarbons and the carbon monoxide released during the filter regeneration, thus making them harmless.

U.S. Pat. No. 4,510,265 describes a self-cleaning diesel particle filter. In that reference, the filter has a catalyst mixture of a metal of the platinum group and silver vanadate. Presence of the catalyst mixture reduces the ignition temperature of the diesel particles.

U.S. Pat. No. 4,849,399 likewise describes a catalyst composition to reduce the ignition temperature of diesel soot. In that reference, the composition contains sulfur-resistant inorganic oxides selected from the group consisting of titanium oxide, zirconium oxide, silicon dioxide, aluminum silicate and aluminum oxide and catalytically active components selected from the group consisting of platinum, palladium and rhodium deposited on the oxide.

According to U.S. Pat. No. 5,100,632, the ignition temperature of diesel soot can be reduced with a catalyst composition containing a platinum group metal and an alkaline earth metal. A catalyst composition of magnesium oxide and platinum and/or rhodium is particularly recommended.

U.S. Pat. No. 5,758,496 describes a particulate and exhaust gas cleaning system containing a particle filter, the porous walls of which are directly coated with a catalytically active metal to oxidize carbon monoxide and unburned hydrocarbons. An additive is added to the fuel to reduce the ignition temperature of the diesel soot deposited on the filter. This additive comprises an organometallic compound in a liquid carrier medium. In particular, it involves organometallic compounds of copper octoate, nickel octoate, or cerium octoate.

U.S. Pat. No. 5,792,436 describes a process for removal of nitrogen oxides and sulfur oxides from the lean exhaust gas of combustion engines. For this purpose, the exhaust gas is passed over a catalyzed trap that contains a combination of a material that absorbs nitrogen oxides and sulfur oxides, and an oxidation catalyst. The absorbing material can be regenerated by raising the temperature of the trap. For that purpose, burnable components are added to the exhaust gas flow during the regeneration phase. Those components are burned at the oxidation catalyst and raise the temperature of the trap to the temperature at which nitrogen oxides and sulfur oxides desorb. Suitable absorber materials are oxides, carbonates, or hydroxides of magnesium, calcium, strontium, barium and lanthanum, as well as oxides of cerium or praseodymium and oxides of elements with atomic numbers of 22 to 29. The oxidation catalyst comprises at least one platinum group metal. The absorbing material and oxidation catalyst are applied as a coating, for example, on a honeycomb structure with parallel open channels or on spherical or tablet-shaped supports arranged in a packing.

U.S. Pat. No. 6,023,928 describes a process for simultaneous reduction of soot particles, unburned hydrocarbons, and carbon monoxide in diesel engine exhaust gas. The process described in that reference utilizes a particle filter catalyzed with platinum in combination with a cerium-containing fuel additive to reduce the ignition temperature of the soot.

Reduction of the soot ignition temperature by a soot ignition coating or by a fuel additive generally cannot assure regeneration of a filter at low engine load. Consequently, frequently a combination of active and passive measures is now used.

The combination of an oxidation catalyst with a particle filter has proven particularly useful. In this type of system, the oxidation catalyst is placed ahead of the particle filter. Because of post-injection or other measures applied to the engine, unburned fuel and carbon monoxide arrive at the oxidation catalyst, where they are converted catalytically to carbon dioxide and water. The heat released in the reaction heats the exhaust gas, and thus also the subsequent particle filter. For example, British Patent 2 134 407 A describes one such system. The amount of post-injection of fuel can be reduced by combination with a catalytic filter coating that reduces the soot ignition temperature or by fuel additives, and the filter can be regenerated at any operating point of the engine.

EP 0 341 832 B1 takes a different path. It describes a process for treating the exhaust gas from heavy trucks. In that reference, the exhaust gas is first passed, without filtering, over an oxidation catalyst so as to oxidize the nitric oxide that it contains to nitrogen dioxide. The exhaust gas containing nitrogen dioxide is then used to burn particles deposited on a subsequent filter, the amount of the nitrogen dioxide being enough to burn the particles deposited on the filter at a temperature of less than 400° C. This system is said to allow continuous regeneration of the particle filter without requiring periodic post-injection of fuel to increase the exhaust gas temperature.

EP 0 835 684 A2 describes a process for treating exhaust gases of light trucks and automobiles. According to this process, the exhaust gas is passed over two catalysts in succession. The first catalyst oxidizes the nitric oxide in the exhaust gas to nitrogen dioxide, which in turn oxidizes to $CO_2$ the soot particles that have deposited on the second catalyst.

The processes described in the last two patents assume a high proportion of nitrogen oxides in the untreated diesel exhaust gas. Unfortunately, it is not usual for that proportion to be sufficient.

In a press release of Apr. 15, 1999, PSA Peugeot Citroën presented a particle filter system for diesel engines with periodic regeneration of the particle filter by burning of the soot particles deposited on the filter. The soot particles deposited on the filter burn in the presence of oxygen only at a temperature of 550° C. Several measures are taken to assure regeneration of the particle filter even during operation of the diesel engine with exhaust gas temperatures of only 150° C. (during trips in the city, for example). For one, the exhaust gas temperature is raised to 450° C. by active measures. Second, a cerium-containing additive that reduces the natural combustion temperature of the soot particles to 450° C. is added to the fuel. Fuel is injected into the cylinders during the expansion phase to raise the exhaust gas temperature. This process is referred to as "post-injection." The afterburning due to that process raises the exhaust gas temperature by 200 to 250° C. There is also further afterburning of unburned hydrocarbons resulting from the post-injection on an oxidation catalyst placed ahead of the filter, which raises further the exhaust gas temperature by another 100° C.

A further critical advantage of the fuel additive is the accelerated filter regeneration. However, it has not yet been possible to assure the post-injection required to initiate the filter regeneration at every operating point. Acceleration of soot combustion, therefore, reduces the occurrence of incomplete filter regeneration. The time during which the post-injection must be maintained can be minimized, which clearly reduces the danger that during regeneration the vehicle may arrive at an operating point for which post-injection is not suitable.

The known processes and exhaust gas systems that add an additive to the fuel to reduce the soot ignition temperature have the disadvantage that after regeneration of the filter, the additive accumulates in the filter as an ash, such as cerium ash. Ash also appears from combustion of lubricating oil carried by the exhaust gas (oil ash). The cerium ash makes up about two thirds of the total ash. With the oil ash, it forms a powdery flocculent composition that remains as a residue in the filter after burning of the soot. After a certain period of operation, depending on the size and oil consumption of the engine, several hundred grams of ash can collect in the filter. That ash substantially increases the exhaust gas back-pressure, resulting in continuously increasing fuel consumption. Therefore, the ash is usually removed from the filter by washing with water after a long period of operation, such as after about 80,000 km.

A further disadvantage of this system, and those systems that operate with uncoated filters, is the high carbon monoxide emissions that occur during the spontaneous or active filter regeneration. The soot collected in the filter, at a loading of up to 8 grams of soot per liter of filter volume burns within a few minutes, which results in incomplete oxidation of the soot particles and in substantial CO emissions.

In light of the above-described problems, the present invention is directed to a particle filter that, by means of a catalytic coating, is able to reduce the soot ignition temperature, accelerate soot burning, and so reduce the energy requirement for regeneration of the soot filter and the danger of interruption of the regeneration. The present invention is also directed to the reduction of CO emissions during active filter regeneration, while extending the interval between two washings of the filter to remove accumulated ash. Further, the present invention is also directed to a process for accelerated combustion on the particle filter of soot particles collected from the lean exhaust gas of a diesel engine.

SUMMARY OF INVENTION

The present invention is directed to a particle filter for removal of soot from diesel engine exhaust gas. By incorporating a catalytically active coating onto a filter body to accelerate burning during a regeneration phase, soot particles may be burned off of the filter. The present invention is also directed to a process for accelerated burning off of soot particles.

According to one embodiment, the present invention provides a particle filter for removing soot from diesel engine exhaust gas. The particle filter is comprised of: (a) a filter body; and (b) a catalytic coating located on said filter body, wherein said catalytic coating comprises compounds of barium, compounds of magnesium and at least one element selected from the platinum group. The compounds of barium and compounds of magnesium may, for example, be as a solid powder material or in supported form on a suitable support material. By way of example, support materials selected from the group consisting of alumina, silica, titania, ceria, zirconia and mixtures or mixed oxides thereof have proved advantageous.

According to a second embodiment, the present invention provides a process for the accelerated combustion of soot from diesel engine exhaust gas comprising using the aforementioned particle filter.

BRIEF DESCRIPTION OF THE FIGURES

The present invention is explained in more detail below by reference to the following figures.

DETAILED DESCRIPTION

Figure 1:
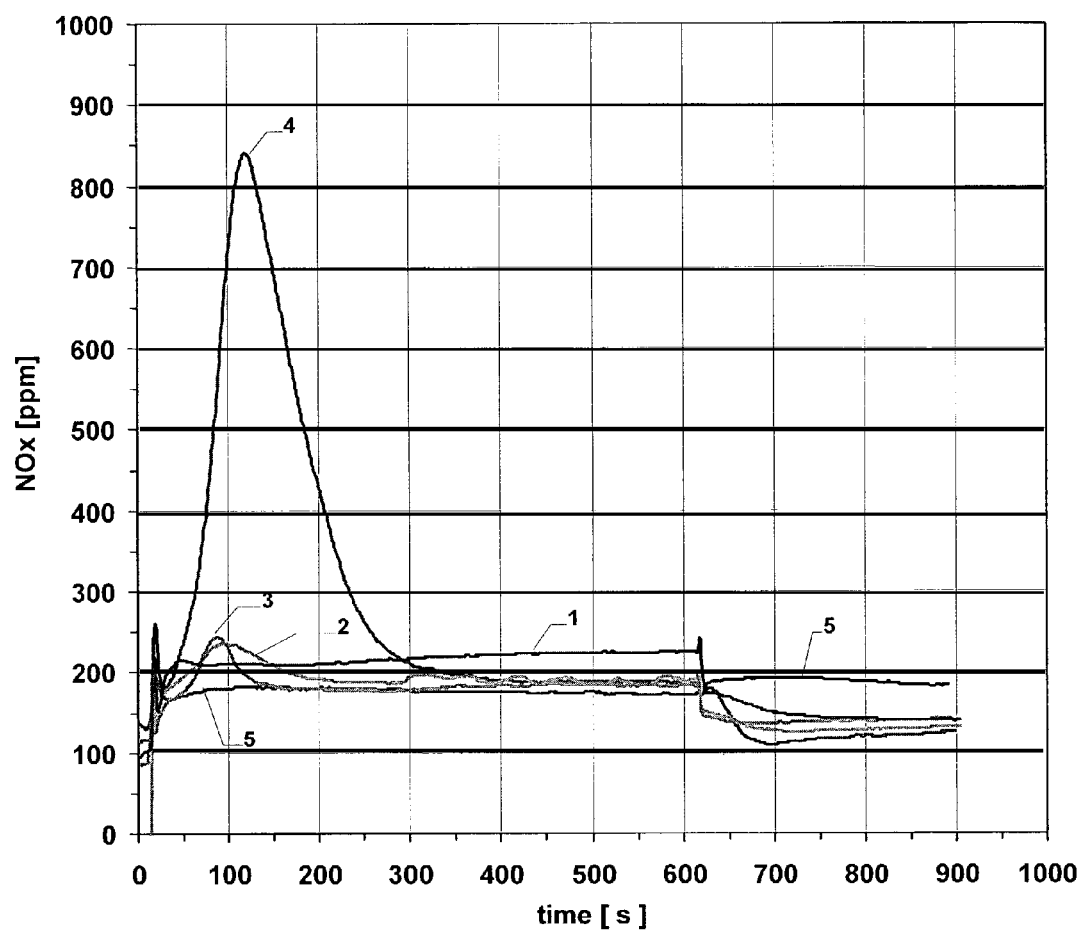
FIG. 1 is a representation of $NO_x$ desorption of various filter coatings with a small quantity of injection.

The present disclosure is not intended to be a treatise on particle filters. Readers are referred to appropriate available texts for background on the subject matter discussed herein.

The present invention is directed to regeneration of soot removing particle filters. Under one embodiment, the present invention provides a filter body and a catalytic coating located on said filter body, wherein the coating comprises compounds of barium, compounds of magnesium and at least one element of the platinum group.

In the terms of this invention, a filter body is understood to be a body with fine open pores that can mechanically filter from diesel engine exhaust gas, preferably more than 80%, more preferably more than 90%, soot particles with sizes in the range between 0.01 and 10 µm. Preferably, one will use "depth filters" of ceramic fibers or wire meshes. Ceramic or metallic foams can also be used as long as the required degree of filtration can be attained.

More preferably, one will use "wall flow filters" with which filtration degrees of greater than 95% can be achieved. Wall flow filters are designed like ordinary honeycomb bodies for automobile exhaust gas catalysts. The filter bodies are generally cylindrical with exhaust gas flow channels running through them from the inlet surface to the outlet surface. They differ from normal exhaust gas catalysts in that the channels of the wall flow filter are alternately plugged at the inlet and outlet surfaces so that the exhaust gas is forced to flow through the porous channel walls in its route from the inlet surface to the outlet surface. The soot particles are filtered out of the exhaust gas stream by that means.

Preferably, wall flow filters manufactured from silicon carbide, cordierite or sodium zirconium phosphate are used. The coating described below may be applied to the inlet side and/or outlet side.

Additionally, preferably the particle filter of the present invention is designed so that at normal operating points, a coating can store nitrogen oxides principally as nitrates, and can desorb them back into the oxygen-containing exhaust gas at temperatures above 300° C., and more preferably above 400° C.

Through the use of this structure, the desorption of the nitrogen oxides does not occur in a reducing atmosphere, as is common for nitrogen oxide storage catalysts, but instead in an oxidizing atmosphere through thermal decomposition. In this system, the nitrogen oxides released, and especially the $NO_2$ being liberated, can react spontaneously with the diesel soot collected in the filter according to Equations (1) or (2) at temperatures of 300 to 350° C.:

$$NO_{2(adsorb.)} \rightarrow NO_{2(desorb.)} \tag{1a}$$

$$C+NO_2(desorb.) \rightarrow CO+NO \tag{1b}$$

$$NO_{2(desorb.)} \rightarrow NO+O* \tag{2a}$$

$$C+O* \rightarrow CO \tag{2b}$$

The carbon monoxide formed in the reaction steps (1b) or (2b) is oxidized at those temperatures to carbon dioxide on the noble metal centers of the catalyst, according to Equation (3):

$$2CO+O_2 \rightarrow CO_2 \tag{3}$$

The energy released in both steps of the reaction promotes burning of soot solely with oxygen in the further course of filter regeneration. Not wishing to be bound to any one theory, it is believed that the $NO_x$ or $NO_2$ stored by the catalytic coating acts only as the initial igniter for the subsequent combustion with oxygen of the carbon soot collected on the filter. The greater the quantity of stored or desorbed $NO_2$ is, the more energy that can be obtained from the first two reaction steps, and the faster the filter regeneration proceeds.

Known $NO_x$ absorbers include but are not limited to oxides, carbonates or hydroxides of alkali metals and alkaline earth metals and lanthanum, oxides of cerium and praseodymium, and oxides of elements with atomic numbers from 22 to 29. These components are generally doped with platinum group metals, especially Pt and/or Pd and/or Rh.

During investigation of these nitrogen oxide storage materials it was found, surprisingly, that the combination of compounds of barium with compounds of magnesium shows especially high storage ability for nitrogen oxides and results in strong and rapid thermal desorption of the nitrogen oxides stored during the filtration phase. The oxides, carbonates, carboxylates, oxalates, or hydroxides are used preferably as the compounds of barium and compounds of magnesium; but it is also possible to use compounds that convert to the corresponding oxides, carbonates or hydroxides under the conditions in which the filter is used. Thus, according to this embodiment, preferably the filter body is comprised of compounds of barium, compounds of magnesium, and at least one platinum group metal.

Further improvements are attained if the coating also contains cerium oxide, zirconium oxide and/or manganese oxide, with the cerium oxide and zirconium oxide preferably used as a mixed oxide. A combination of cerium oxide with manganese oxide, barium carbonate and magnesium oxide in the coating is particularly advantageous. A particle filter with such a coating exhibits very strong and rapid desorption during the regeneration phase of the nitrogen oxides stored in the filtration phase. Additionally, the regeneration time of the filter is correspondingly shortened.

In one embodiment, the compounds of barium occur in the coating in combination with a homogeneous Mg/Al mixed oxide of magnesium oxide and aluminum oxide in which the mixed oxide contains magnesium oxide at a concentration of 1 to 40% by weight, based on the total weight of the Mg/Al mixed oxide. In this embodiment, preferably there is at least one element selected from the group consisting of the platinum, palladium, rhodium, and mixtures thereof that is completely or partially deposited on the magnesium mixed oxide.

In another embodiment, in addition to the compounds of barium, compounds of magnesium and at least one element of the platinum group, the coating further comprises compounds of cerium, zirconium, manganese, lanthanum, niobium or tantalum in an amount between about 10% and about 80% by weight based on the total weight of the coating. Preferably, the coating comprises oxides of cerium, zirconium, manganese, barium and/or magnesium.

According to a second embodiment, the present invention is directed to a process for accelerated combustion of soot particles collected on a particle filter from lean exhaust gas from combustion engines. In this process, a particle filter is regenerated by raising the temperature of the particle filter above the soot ignition temperature and burning off the soot particles. To accomplish this process, one may use a coating comprised of compounds of barium, compounds of magnesium and at least one element from the platinum group. Further, the coatings described in connection with the first embodiment may be used with this embodiment.

The process utilizes active and passive measures to reduce the particle content and also the concentrations of hydrocarbons and carbon monoxide in the exhaust gas of a diesel engine. The process is divided into a filtration phase and a regeneration phase, which repeat cyclically. During the filtration phase the soot particles are filtered out of the exhaust gas stream and deposited on the filter. At the same time, carbon monoxide and hydrocarbons are, in large part, converted to carbon dioxide and water by the preceding oxidation catalyst. Because of the low content of these oxidizable exhaust gas components in the exhaust gas, the energy released in the reaction is not adequate to heat the filter to the regeneration temperature.

As the soot deposit increases, the exhaust backpressure of the filter increases, reducing the power of the diesel engine. Therefore, filter regeneration must be started when the exhaust gas backpressure reaches a level that can be preset. To do so, the exhaust gas temperature must be increased to the temperature required to ignite the soot. Measures suitable for raising the temperature include post-injection of diesel fuel into the cylinders of the diesel engine or into the exhaust line ahead of the particle filter, a late combustion situation, multistage combustion, or external heating.

It is preferable, though, to inject the additional fuel required to heat the particle filter into the cylinders of the diesel engine during the expansion phase. Because of the afterburning in the cylinders, the exhaust gas temperature is raised by about 150 to 200° C. Not all of the fuel post-injected is burned during the afterburning. Instead, a certain proportion of unburned hydrocarbon gets into the exhaust gas and to the particle filter or to an oxidation catalyst positioned in front of the particle filter.

During post-injection of fuel into the cylinders of the diesel engine the resulting exhaust gas has to stay net oxidizing to ensure that the unburned fuel can be burned completely at the catalytic coating of the particle filter. If the oxidative effect of the filter coating on the unburned fuel is not sufficient, a diesel oxidation catalyst (DOC) can be installed in the exhaust system ahead of the filter. It produces effective combustion of the unburned hydrocarbons. The maximum attainable temperature increase depends on the amount of fuel post-injected.

After the post-injection begins, the exhaust gas temperature initially rises very rapidly, approaching a maximum asymptotically as the post-injection continues. If the amount of post-injected fuel is sufficient to make sure that this maximum exhaust gas temperature is above the soot ignition temperature, then thermal desorption of the nitrogen oxides stored on the filter coating during the normal operation begins even during the temperature rise. The desorbed nitrogen oxides react spontaneously with the soot particles collected on the filter, releasing heat. Thus, any residual soot still remaining in the filter can be burned with the oxygen in the exhaust gas.

After regeneration is complete, addition of extra fuel is stopped and the filtration phase begins again.

Because of the components of the catalytic coating of the particle filter that reduce the soot ignition temperature and accelerate soot combustion, less added fuel is consumed for filter regeneration than without those components. Additionally, the total period needed for post-injection is also reduced because of the shortened regeneration time, and the danger of a potential interruption of regeneration is minimized. Furthermore, the platinum component of the coating reduces the carbon monoxide emissions occurring during the spontaneous regeneration.

Another advantage of the invention, compared with the processes known in the state of the art, is the fact that no ash from the additives can collect in the filter. There are only oil ash deposits, as also happened with the other processes. The maintenance interval for removal of such ash from the filter by appropriate flushing or washing processes with water can then be extended substantially compared to the processes with fuel additives. As appropriate experiments have shown, the catalytic coating of the filter is resistant to such washing processes.

Various types of filters are suitable for the process, such as wall flow filters, filters of ceramic fibers or ceramic or metallic foam, and filters of wire mesh. It is preferable to use wall flow filters of silicon carbide, cordierite, or sodium zirconium phosphate. These filters are only coated from the inlet side. The concentration of the coating is preferably between 20 and 200 grams per liter of filter body, while the concentration of the platinum group metal(s) is preferably 0.5 to 10 grams/liter of filter body.

The present invention may be used to clean exhaust gases of vehicles with diesel engines. For carrying out the process according to this invention the power system of such a motor vehicle contains a diesel engine and an exhaust gas cleaning system with a diesel oxidation catalyst and a particle filter. The exhaust gas temperature of the engine can be increased for filter regeneration by post-injecting fuel into the diesel engine cylinders during the expansion phase. The particle filter of this power system is provided with the catalytic coating described above, which provides both a $NO_x$ storage coating and a noble metal component for oxidation of carbon monoxide and, if necessary, of hydrocarbons. One particularly advantageous embodiment of this drive system contains an oxidation catalyst in a position near the engine, ahead of the particle filter, which is dimensioned, so that when fuel is post-injected, only a small part of the fuel reacts. This oxidation catalyst is preferably introduced ahead of or immediately behind the turbocharger in the exhaust gas line of the diesel engine. Because of its position near the engine, it reaches its operating temperature very rapidly, so that it can reduce part of the CO and HC emissions during a cold start. But because of its small volume, it cannot convert all the hydrocarbons introduced by post-injection during a regeneration of the particle filter, so that most of the post-injected fuel gets to the particle filter, where it is burned on contact with the oxidative function of the catalytic coating.

To produce the catalytic coating for the filter, the solid components of the coating are processed into a preferably aqueous coating suspension. Then the filter is coated with this suspension on what will later be the inlet side for the exhaust gas, using known processes. Optionally, the upstream and downstream sections of the filter are also coated. Then the suspension is dried and calcined. The platinum group metal(s) can be deposited on the solid components of the coating just before preparation of the coating suspension, or they can be added to the aqueous coating suspension in the form of soluble precursor compounds. Alternatively, the platinum group metal(s) can be introduced into the coating only after the coating has been prepared, by a supplemental impregnation with a solution of the precursor compounds. After the impregnation has been finished, the filter body must again be dried and calcined.

EXAMPLES

The present invention is illustrated by the following examples. These are merely illustrative and should not be construed as limiting the scope of the invention.

Example 1

The reduction of the soot ignition temperature and the acceleration of the soot combustion by various $NO_x$ storage coatings were investigated in the following examples and comparison examples. The investigations used cylindrical wall flow filters of silicon carbide with a cell density (number of flow channels per cross-sectional area of the filter) of 41 $cm^{-2}$, a length of 15.2 cm and a diameter of 14.4 cm (volume ca. 2.5 liters).

Particle filters were coated with the coating compositions listed in Table 1:

TABLE 1

Coating compositions

| | Coating components | Weight ratio |
|---|---|---|
| Comparison example 1 | $Pt/CeO_2MnO_2$ | $CeO_2:MnO_2 = 1:1$ |
| Comparison example 2 | $Pt/CeO_2MnO_2 + MgO$ | $CeO_2:MnO_2:MgO = 2:2:1$ |
| Comparison example 3 | $Pt/CeO_2MnO_2 + BaCO_3$ | $CeO_2:MnO_2:BaCO_3 = 2:2:1$ |
| Example | $Pt/CeO_2MnO_2 + BaCO_3 + MgO$ | $CeO_2:MnO_2:BaCO_3:MgO = 2:2:1:1$ |

Each of the cerium oxides used was stabilized with 30% by weight zirconium oxide. Before the coating suspension was prepared, a mixture of cerium oxide and manganese oxide was first coated with the required amount of platinum by impregnation with hexachloroplatinic acid, dried, and calcined in air at 500° C. The amount of platinum was chosen so as to give a platinum concentration of 3.18 grams platinum per liter of filter body (90 grams/cubic foot) when the filter body was coated with 150 grams of the storage component per liter of filter body.

To coat the filter bodies, the oxide powder catalyzed with platinum and, optionally, MgO and $BaCO_3$ was suspended in an amount of water equivalent to the previously determined water uptake capacity of the filter bodies. These suspensions were carefully milled and then poured over the inlet surfaces of the filter bodies. Then the filter bodies were dried and calcined.

Testing the Particle Filters:

Each filter was initially loaded with about 8 grams of soot on a 2.2-liter diesel engine (with direct injection) at defined operating conditions. Then regeneration of the filter was started by enriching the exhaust gas stream with hydrocarbons. Burning of the hydrocarbons in the exhaust gas at a diesel oxidation catalyst ahead of the filter increased the exhaust gas temperature by 50 to 100° C.

Two different post-injection quantities were used. On uninterrupted post-injection they had given exhaust gas temperatures, ahead of the filter, of 500° C. (low injection amount) and 600° C. (high injection amount).

Beginning with the start of post-injection, the following measurements were performed:

Measurement of NOx-concentration in the exhaust gas ahead of the filter (curve 5 in FIGS. 1 and 2) and behind the filter coated with the different coatings according to Table 1 (curve 1: comparison example 1; curve 2: comparison example 2; curve 3: comparison example 3; curve 4: example)

Figure 2:
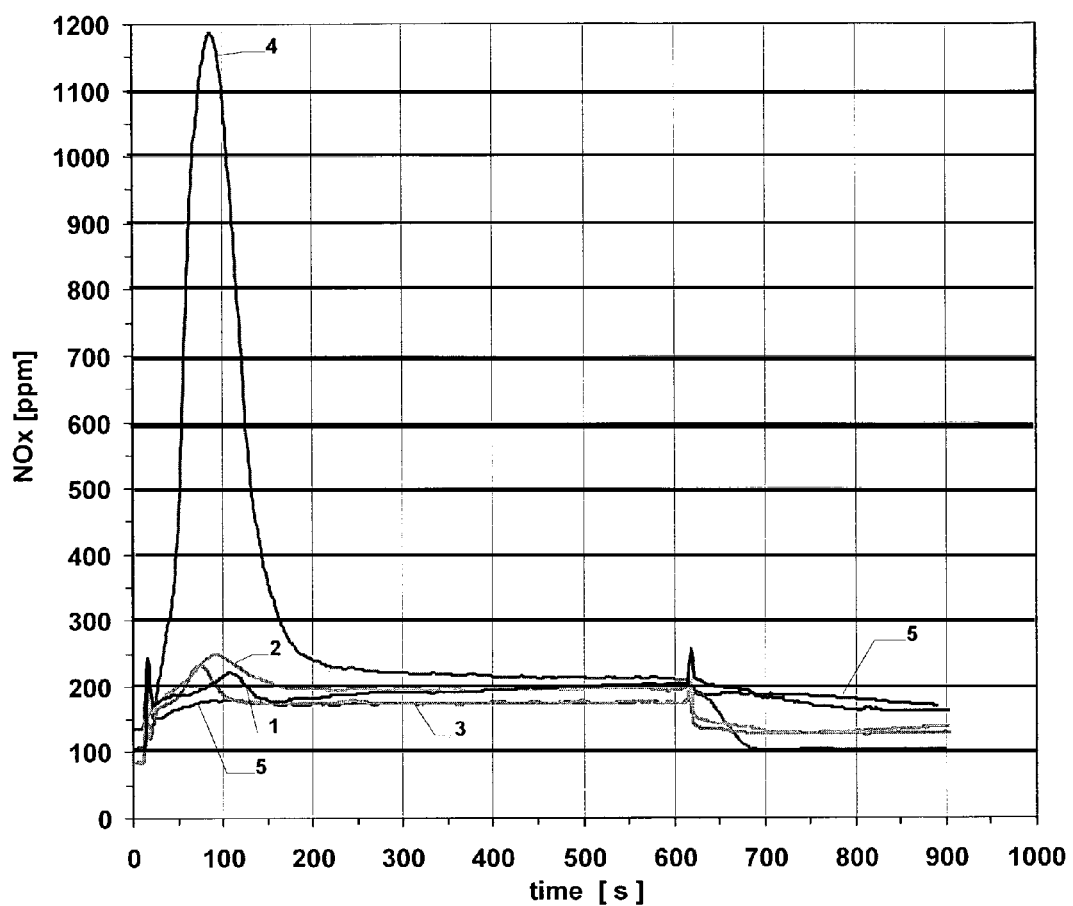
FIG. 2 is a representation of $NO_x$ desorption of various filter coatings with a large quantity of injection.

FIG. 1 shows the NOx-concentration curves for the regeneration with low injection amount and FIG. 2 shows the respective curves for regeneration with high injection amount.

Figure 3:
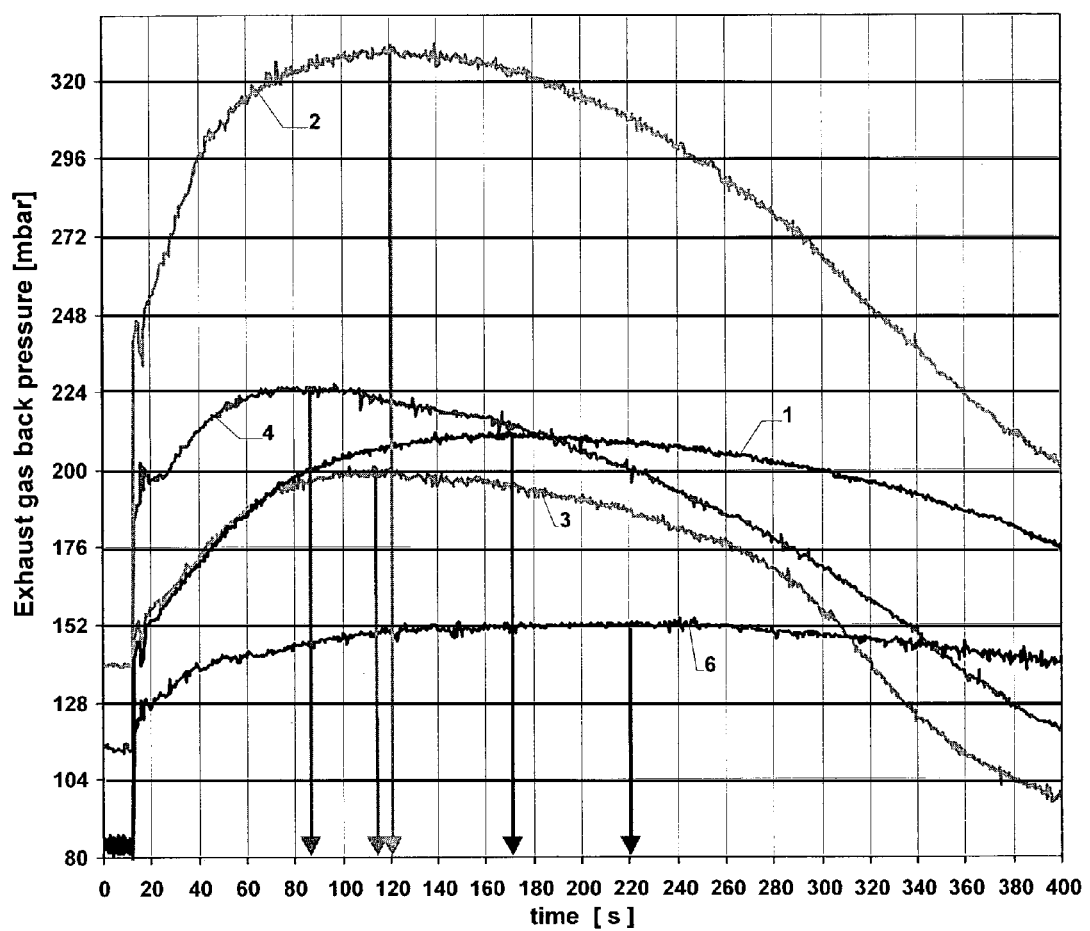
FIG. 3 is a representation of exhaust gas back pressure generated by the filter during regeneration with a small quantity of injection.
Figure 4:
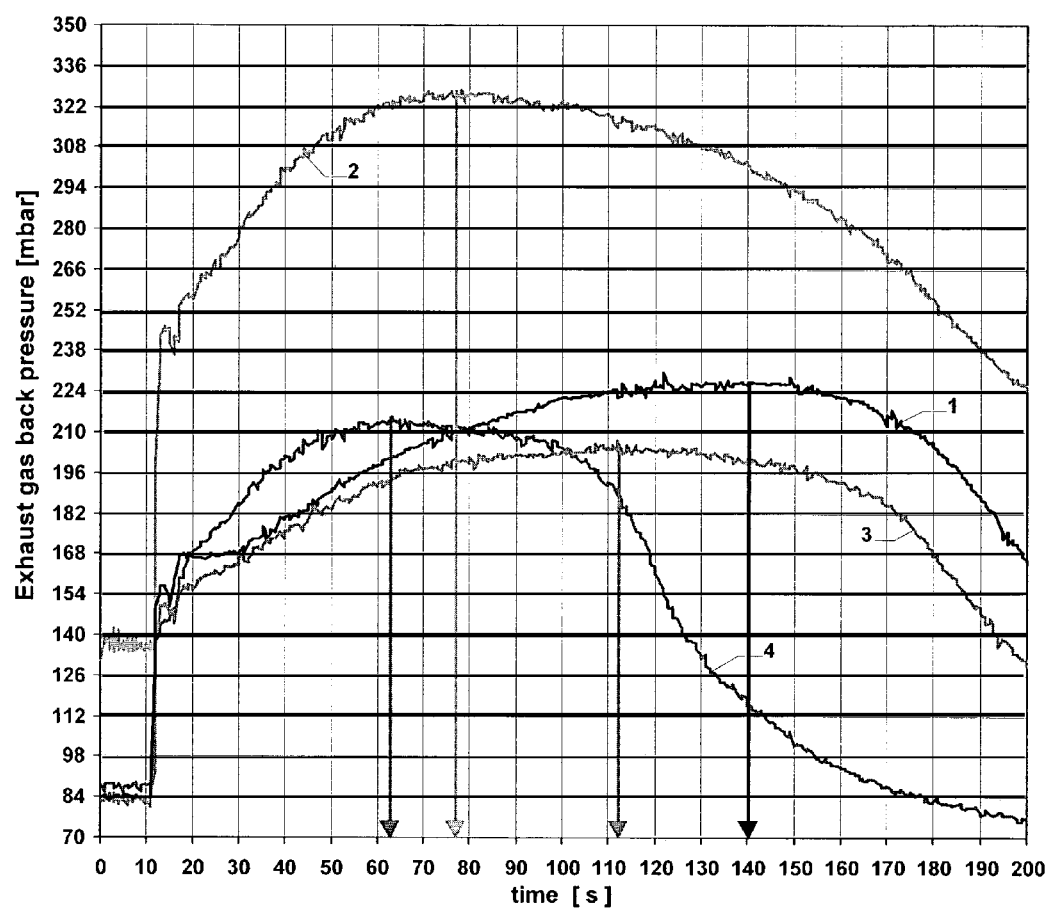
FIG. 4 is a representation of exhaust gas back pressure generated by the filter during regeneration with a large quantity of injection.

Measurement of exhaust gas back pressure during regeneration for an uncoated filter (curve 6 in FIG. 3) as well as for the filters coated with the different coatings according to Table 1 (curve 1: comparison example 1; curve 2: comparison example 2; curve 3: comparison example 3; curve 4: example) for low injection amount in FIG. 3 and for high injection amount in FIG. 4.

While the exhaust gas temperature was increasing, the exhaust backpressure was also rising because of the rising temperature (FIGS. 3 and 4). When a certain filter inlet temperature was reached, the $NO_x$ desorption started, and then the soot burning commenced. It should be noted that the exhaust backpressure passed through a maximum and then decreased to the value before the filter was coated with soot. The beginning of filter regeneration (taken to be the maximum in the filter back pressure curve) was recorded for each case, and is shown in Table 2, following, for the various filter coatings.

TABLE 2

Beginning of soot burning

| Filter coating 150 g/liter | Start of regeneration in [s] post-injection time for low injection amount | Start of regeneration in [s] post-injection time for high injection amount |
|---|---|---|
| None | ca. 220 | |
| $Pt/CeO_2MnO_2$ 1:1 | 170 | 140 |
| $Pt/CeO_2MnO_2MgO$ 2:2:1 | 120 | 78 |
| $Pt/CeO_2MnO_2BaCO_3$ 2:2:1 | 115 | 112 |
| $Pt/CeO_2MnO_2BaCO_3MgO$ 2:2:1:1 | 85 | 62 |

It is apparent from FIGS. 1 and 2 that the $NO_x$ storage capacity of the comparison coatings was relatively low. Only the coating according to the invention (curve 4) shows a strong desorption of nitrogen oxides during regeneration which had been previously adsorbed by the coating.

Although the comparison coating did also produce acceleration of filter regeneration in comparison to the uncoated filter, the coating according to the invention gave a substantially stronger acceleration.

The coating according to the present invention with a combination of magnesium oxide and barium carbonate, combined with cerium oxide, zirconium oxide and manganese oxide obviously shows a many times higher $NO_x$ storage capacity due to synergistic effects (see FIGS. 1 and 2). Correspondingly, the beginning of filter regeneration was substantially speeded up at both low and high injection quantity, and the regeneration time of the filter was reduced (FIGS. 3 and 4).

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A particle filter for removing soot from diesel engine exhaust gas, said particle filter comprising:
    (a) a filter body;
    (b) a catalytic coating located on said catalytic coating comprises compounds of compounds of and at least one element of the platinum, wherein the compounds of barium and compounds of magnesium occur as material or in supported form on a support material and the compounds of barium and compounds of magnesium are selected from the group consisting of carbonates, oxalates, hydroxides, carboxylates, oxides, and mixtures thereof, and the compounds of barium occur in the coating in combination with a homogeneous Mg/Al mixed oxide of magnesium oxide and aluminum oxide, in which the mixed oxide contains magnesium oxide at a concentration of 1 to 40% by weight, based on the total weight of the Mg/Al mixed oxide; and
    (c) the coating comprises oxides of cerium, zirconium, and manganese.

2. The particle filter of claim 1, wherein said at least one element of the platinum group metals is selected from the group consisting of platinum, palladium, rhodium, and mixtures thereof and is completely or partially deposited on the Mg/Al mixed oxide.

3. The particle filter of claim 1, wherein the filter body is a wall flow filter with an inlet side and an outlet side and is manufactured from silicon carbide, cordierite, or sodium zirconium phosphate.

4. The particle filter of claim 3, wherein the coating is applied to both sides of the filter.

5. The particle filter of claim 3, wherein the coating is applied only to the inlet side of the filter.

6. The particle filter of claim 1, wherein the coating comprises magnesium oxide and barium carbonate, combined with cerium oxide, zirconium oxide and manganese oxide.

* * * * *

UNITED STATES PATENT AND TRADEMARK OFFICE
CERTIFICATE OF CORRECTION

PATENT NO.        : 7,351,382 B2
APPLICATION NO.   : 10/397984
DATED             : April 1, 2008
INVENTOR(S)       : Pfeifer et al.

Page 1 of 1

It is certified that error appears in the above-identified patent and that said Letters Patent is hereby corrected as shown below:

In claim 1, column 11, line 15, after said, insert -- filter body, said --

In claim 1, column 11, line 16, delete "of compounds of" and insert -- of barium, compounds of magnesium --

In claim 1, column 11, line 17, after platinum, insert -- group metals --

In claim I, column 11, line 18, after occur as, insert -- solid powder --

Signed and Sealed this

Tenth Day of November, 2009

David J. Kappos
*Director of the United States Patent and Trademark Office*